United States Patent [19]

Husch

[11] 3,954,819

[45] May 4, 1976

[54] METHOD AND COMPOSITION FOR TREATING EDIBLE OILS

[75] Inventor: Robert L. Husch, Chicago, Ill.

[73] Assignee: Interstate Foods Corporation, Chicago, Ill.

[22] Filed: Mar. 28, 1969

[21] Appl. No.: 811,614

[52] U.S. Cl. .......... 260/428; 426/271; 426/417

[51] Int. Cl.[2] .......... C09F 5/10

[58] Field of Search .......... 260/428, 419; 99/118; 426/271, 417

[56] References Cited

UNITED STATES PATENTS

| | | | |
|---|---|---|---|
| 1,992,979 | 3/1935 | Wollner | 260/428 |
| 2,867,639 | 1/1959 | Watts | 260/428 |
| 3,221,008 | 11/1965 | Wolf et al. | 260/210 |
| 3,347,783 | 10/1967 | Feldbauer, Jr. | 208/310 |

OTHER PUBLICATIONS

Condensed Chem. Dictionary, Sixth Edition Reinhold Publishing Corp., Aug., 1961, pp. 612 & 1241.

*Primary Examiner*—Ethel G. Love
*Attorney, Agent, or Firm*—Dressler, Goldsmith, Clement & Gordon, Ltd.

[57] ABSTRACT

A method for treating an edible oil containing fatty acids which comprises the treatment of the edible oil with a molecular sieve to remove fatty acids therefrom.

10 Claims, No Drawings

METHOD AND COMPOSITION FOR TREATING EDIBLE OILS

BACKGROUND OF THE INVENTION

This invention relates to a method for treating edible oils. More particularly, the invention relates to a method for treating edible oils to remove excessive amounts of fatty acids present in the edible oils to render the edible oils more suitable for preparation of foods.

For a number of years in the United States, there has been an increasing use of edible oils such as crude and refined vegetable and marine oils and animal fats in the preparation of foods. Examples of such foods are the french fried potatoes, fried chicken and fried fish, etc., which are normally fried in shortening. The wide preference for such fried foods has brought about a substantial number of drive-in and regular restaurants which prepare and serve foods fried in shortening.

As is well known, shortening is generally prepared from fats and oils. Fats and oils are esters of higher fatty acids and a trihydric alcohol, glycerol. Such esters are known as glycerides. However, glycerides in shortening, as well as those in fats and oils, are subject to deterioration through contact with water or by thermal degradation. For example, the glycerides may be hydrolyzed to yield glycerol and free fatty acids or their salts.

In the frying of foods, some foods such as potatoes absorb a substantial amount of the edible oil, such as shortening, in which the food is being fried, so that there is a continuous depletion of the edible oil and the addition of fresh make-up oil. Other foods such as fish do not absorb appreciable amounts of oil and, therefore, the same batch of oil is used repeatedly for a long period of time. In the frying of such relatively nonabsorbent foods, there is a tendency for free fatty acids to accumulate in the oil. Free fatty acids are extremely objectionable in foods and their presence in amounts exceeding about 1.2 or 1.3% by weight of the oil generally renders the oil unsuitable for use in frying foods.

From the above, it can be gathered that in the frying of a nonabsorbent food, such as fish, the edible oil is periodically observed for indications of degradation. When the fatty acids content of the oil exceeds the objectionable amount, it must be discarded. To my knowledge, there is nothing commercially available at the present time which can be used to extend the life of edible oil which contains an excessive amount of free fatty acids.

It is, accordingly, an object of the present invention to provide a method for extending the life of edible oil which contains excessive amounts of free fatty acids.

It is another object of the invention to provide an economical method for treating edible oil.

It is a further object of the present invention to provide a relatively simple method for removing free fatty acids from edible oils, which is economical and quick to use.

Further objects of the invention can be gathered from the following disclosure.

SUMMARY OF THE INVENTION

In accordance with the present invention, I provide a method for extending the life of edible oil used in the frying of foods by removing the free fatty acids therefrom. As used herein, the term "free fatty acids" is intended to cover free fatty acids and their common salts. The removal of the free fatty acids is accomplished by passing the edible oil through a bed containing a molecular sieve. Other treating materials for the edible oil, such as a bleaching agent or a physical filtering aid material, can also be used with a molecular sieve in the practice of the invention.

The method of the invention will reduce the free fatty acids content of the edible oil to a very low level. In this manner, the method of the invention will extend the life of edible oil as well as make the foods fried in the oil better for human consumption because of the minimal free fatty acids content.

DESCRIPTION OF THE PREFERRED EMBODIMENT

As indicated above, the present invention contemplates the treating of edible oil by passing it through a bed containing a molecular sieve which is capable of removing free fatty acids therefrom. Examples of suitable molecular sieves are those made by the Linde Company and under the trade designation 10 X and 13 X.

The bed of molecular sieve used in the method of the present invention may suitably be supported by a liquid permeable support, such as a filter cloth or paper, in a filtering apparatus, such as a grid, a funnel or a filter press.

In the practice of this invention the molecular sieve may be used either alone or in combination with other treating materials for the edible oil. Thus, a filter paper or cloth may be advantageously placed on top of the bed of molecular sieve so that prior to passing the oil into contact with the molecular sieve, any breaded particles and other food matters in the shortening may be filtered out and not contaminate the bed of molecular sieve. Other materials which may be advantageously used in conjunction with the molecular sieve are various filtering aids. These filtering aids include diatomaceous earth, asbestos filtering aids, and purified cellulose materials. Examples of the diatomaceous earth which may be used in the treatment of the invention include fuller's earth and a family of filtering aids sold by the Johns-Manville Products Corporation under the name Celite. If a diatomaceous earth is to be used in connection with the treatment of the present invention, the earth may be mixed with the molecular sieve so that the edible oil needs to be passed through only one bed of treating material. Alternatively, the molecular sieve and the diatomaceous earth may form separate beds disposed in a series relationship so that the edible oil can pass from one bed into the other.

The amount of the molecular sieve to be used depends on the particular molecular sieve employed and the amount of free fatty acids to be removed. For example, I have found that the molecular sieve is capable of removing about 1/10th its own weight in fatty acids. Thus, if 100 pounds of edible oil is to be treated, whose fatty acids content is to be reduced from 0.5 by weight to 0.05% by weight, about 0.45 pound of free fatty acids must be removed which would require the use of about 4.5 pounds of molecular sieve.

When only a few pounds or less of molecular sieve are needed and used, it would not be economical to attempt to remove the free fatty acids therein by regeneration so that the molecular sieve may be reused. However, the spent molecular sieve may be collected and stored until a sufficient quantity is gathered to justify regeneration.

The treatment of the present invention may also be used to reduce the free fatty acids content of crude edible oils and fats such as shortening. Crude shortening or oil usually contains some fatty acids which must be removed. Presently the most common deacidification process for crude oils and fats is by alkali refining. Alkali refining involves adding moderately strong solutions of caustic soda or alkaline salts such as sodium carbonate. Such a treatment requires a chemical reaction followed by a separation process. Thus, deacidification by alkali refining is clearly time consuming and inconvenient as well as being expensive. In accordance with the present invention, such deacidification of crude shortening may now be carried out in a continuous manner which is extremely convenient and economical to use. For example, if 10,000 pounds of crude shortening per hour is to be treated to reduce the free fatty acids content therein from 0.5 to 0.05% by weight, about 45 pounds of fatty acids must be removed per hour which would require the use of about 450 pounds of a molecular sieve. This may be accomplished in a continuous manner, for example, by providing at least two reactors disposed in parallel, each of which contains 2,000 pounds of molecular sieve. In practice, one of the two reactors may be used to treat the crude shortening, while the other reactor would be in the regeneration cycle. Such a system of two reactors can provide continuous treatment for crude edible oils and fats and requires switching between the reactors only once every few hours.

The method for determining the free fatty acids content of an edible oil is known to those skilled in this art. As a specific example, the Official Method Ca 5*a*-40 of the American Oil Chemists' Society may be used. This method is applicable to crude and refined vegetable and marine oils and animal fats.

The invention will now be described in further detail with reference to specific examples.

EXAMPLE 1

A large commercial frying vessel containing about 42 pounds of shortening was used to fry 12.6 pounds of fish a day. Using fresh shortening at the beginning of the day, it was found that at the end of one day's fish frying, the free fatty acid content of the shortening had increased from about 0.05% by weight to about 0.13%. At the same time, the peroxide value of the shortening had risen from 0.5 to about 4.4. The peroxide value of the shortening is an indication of the rancidity of the shortening. At the end of the day of frying, the shortening was filtered through a bed containing 1.7 pounds of a filtering material which contains 15% of a molecular sieve 13X, 40% Micro Cell T-49 (made by Johns-Manville), 40% Clarolite S (made by Georgia Kaolin Company), and 5% Solka Floc (made by Grefco). All percentages are by weight. After this treatment, the shortening was found to contain about 0.04% by weight of free fatty acids and its peroxide value has been reduced to 3.0.

The Micro Cell T-49 is a filter aid. The Clarolite S is also a filter aid and it is an asbestos material which facilitates the flow of the shortening through the filtering bed. The Solka Floc is a purified cellulose material which reduces the dusting of the bed of filtering material.

EXAMPLE 2

The batch of 42 pounds in Example 1 was continually used to fry fish for a period of 10 days. After each day's use, the shortening was treated as in Example 1. Fresh make-up shortening was added from time to time to maintain the batch of shortening at about 42 pounds. At the end of the 10 days' frying, a total of about 252 pounds of fish had been cooked in the shortening. At the beginning of the tenth day, the shortening contained about 0.065% free fatty acids. After the tenth day, the shortening contained about 0.23% free fatty acids. The shortening was then put through 1.7 pounds of the material described in Example 1 and the free fatty acids content was reduced to 0.07% by weight.

From this example, it can be seen that the shortening has a tendency to slightly deteriorate with prolonged use so that the increase in acids content during the tenth day is much greater than that for the first day.

EXAMPLE 3

Another fresh batch of 42 pounds of shortening was placed in a commercial frying pan and used to fry about 25 pounds of fish per day. At the end of each day, the shortening was filtered through a bed of fuller's earth. After three days' usage, with a total of 75 pounds of fish fried therein, and after the final filtration through fuller's earth, the acids content in the shortening was found to be 0.38% by weight.

By comparing the results of Examples 2 and 3, it can be seen that the treatment of the present invention is extremely effective in reducing the fatty acids content of shortening used in frying foods. In this manner, the useful life of the shortening employed in frying foods has been extended greatly and the fatty acids content of the foods fried in the shortening treated by the present process has also been greatly reduced. This results in a fried food which contains less fatty acids and so is more suitable for human consumption.

The invention has been described in detail with reference to particular and preferred embodiments thereof, but it will be understood that variations and modifications can be made within the spirit and scope of the invention as described hereinabove and as defined in the appended claims.

What is claimed is:

1. A method for treating edible oil to reduce the free fatty acids content therein, said method comprising providing a bed containing a molecular sieve capable of removing said free fatty acids from said oil, and passing said oil through said bed to thereby reduce the free fatty acids contained therein.

2. A method for treating edible oil to reduce the free fatty acids content therein so as to produce edible oil useful in cooking operations, said method comprising providing a bed containing a Type X molecular sieve capable of removing said free fatty acids from said oil, and passing said oil through said bed to thereby reduce the free fatty acids contained therein.

3. A method according to claim 2 wherein about 10 parts by weight of said Type X molecular sieve are provided for each part of free fatty acids present in said oil.

4. A method according to claim 2 wherein said bed further contains a filtering aid.

5. A method according to claim 2 wherein said filtering aid is a diatomaceous earth.

6. A continuous method for treating crude edible oil to reduce the free fatty acids content therein so as to produce edible oil useful in cooking operations for the preparation of foods, said method comprising: providing at least two reactors each containing a Type X molecular sieve capable of removing said free fatty acids from said oil; passing said oil through the first of said reactors to contact the oil with said molecular sieve therein while simultaneously regenerating the spent molecular sieve in another of said reactors; and passing said crude oil through a reactor containing the regenerated molecular sieve after said molecular sieve in said first reactor has become saturated with respect to said free fatty acids so that said first reactor may be regenerated.

7. A method according to claim 6 wherein about 10 parts by weight of Type X molecular sieve are provided for each part of free fatty acids present in the oil from which free fatty acids are to be removed.

8. A method for treating an edible oil containing free fatty acids to effect a reduction of the fatty acid content thereof, comprising passing said oil through a reactor containing a molecular sieve capable of removing fatty acids from said oil, thereby effecting removal of fatty acids from said oil by said sieve.

9. A method in accordance with claim 8 wherein said edible oil has been used in a cooling operation prior to being passed through said contained molecular sieve.

10. A method in accordance with claim 9 wherein a filtering aid is used in conjunction with said molecular sieve and the oil is passed therethrough to effect removal of fatty acids.

* * * * *

UNITED STATES PATENT OFFICE
CERTIFICATE OF CORRECTION

PATENT NO. : 3,954,819
DATED : May 4, 1976
INVENTOR(S) : Robert L. Husch

It is certified that error appears in the above-identified patent and that said Letters Patent are hereby corrected as shown below:

Column 2, line 59, 0.5 should be -- 0.5% --.

Column 3, line 19, 0.5 should be -- 0.5% --.

Column 6, line 10, cooling should be -- cooking --.

Signed and Sealed this

Nineteenth Day of October 1976

[SEAL]

*Attest:*

RUTH C. MASON
*Attesting Officer*

C. MARSHALL DANN
*Commissioner of Patents and Trademarks*